US011274218B2

(12) United States Patent
Yun et al.

(10) Patent No.: US 11,274,218 B2
(45) Date of Patent: Mar. 15, 2022

(54) THERMOSETTING RESIN COMPOSITION FOR COATING METAL THIN FILM AND METAL LAMINATE USING THE SAME

(71) Applicant: LG CHEM, LTD., Seoul (KR)

(72) Inventors: Minhyuk Yun, Daejeon (KR); Young Chan Kim, Daejeon (KR); Hyunsung Min, Daejeon (KR); Changbo Shim, Daejeon (KR); Hee Yong Shim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 144 days.

(21) Appl. No.: 16/606,652

(22) PCT Filed: Dec. 11, 2018

(86) PCT No.: PCT/KR2018/015649
§ 371 (c)(1),
(2) Date: Oct. 18, 2019

(87) PCT Pub. No.: WO2019/117574
PCT Pub. Date: Jun. 20, 2019

(65) Prior Publication Data
US 2021/0114348 A1    Apr. 22, 2021

(30) Foreign Application Priority Data

Dec. 11, 2017  (KR) .......................... 10-2017-0169493
Dec. 7, 2018   (KR) .......................... 10-2018-0157084

(51) Int. Cl.
*C09D 7/61*    (2018.01)
*C09D 7/65*    (2018.01)
*B32B 15/04*   (2006.01)
*C09D 163/00*  (2006.01)
*C09D 167/00*  (2006.01)
*C09D 179/08*  (2006.01)
*C08L 9/00*    (2006.01)
(Continued)

(52) U.S. Cl.
CPC ................ *C09D 7/61* (2018.01); *B05D 7/14* (2013.01); *B32B 15/043* (2013.01); *C08L 9/00* (2013.01); *C09D 7/65* (2018.01); *C09D 163/00* (2013.01); *C09D 167/00* (2013.01); *C09D 179/08* (2013.01); *B32B 2255/06* (2013.01); *B32B 2255/26* (2013.01); *C08K 3/013* (2018.01)

(58) Field of Classification Search
CPC .......... C08L 61/14; C08L 33/08; C08L 61/34; C08L 63/00–10; C08L 79/085; C09D 161/14; C09D 163/00–10
See application file for complete search history.

(56) References Cited

U.S. PATENT DOCUMENTS 10,294,341 B2 *  5/2019  Moon .................... C08L 33/24
2003/0018131 A1  1/2003  Davis et al.
(Continued)

FOREIGN PATENT DOCUMENTS

CN    1768089 A    5/2006
CN    101328301 A  12/2008
(Continued)

*Primary Examiner* — Monique R Jackson
(74) *Attorney, Agent, or Firm* — Dentons US LLP

(57) ABSTRACT

The present invention relates to a thermosetting resin composition for coating a metal film having high flowability and pattern-filling property and a metal laminate using the same.

11 Claims, 1 Drawing Sheet

(51) Int. Cl.
*C08K 3/013* (2018.01)
*B05D 7/14* (2006.01)

(56) References Cited

U.S. PATENT DOCUMENTS

| | | | |
|---|---|---|---|
| 2005/0019554 A1* | 1/2005 | Orikabe | H05K 3/4661 |
| | | | 428/327 |
| 2005/0129895 A1* | 6/2005 | Nakamura | H05K 3/4661 |
| | | | 428/40.1 |
| 2006/0135706 A1 | 6/2006 | Davis et al. | |
| 2006/0205891 A1* | 9/2006 | Tanaka | C08L 79/08 |
| | | | 525/390 |
| 2007/0287801 A1 | 12/2007 | Davis et al. | |
| 2010/0068958 A1 | 3/2010 | Carson et al. | |
| 2011/0045304 A1 | 2/2011 | Su | |
| 2011/0092640 A1 | 4/2011 | Tzou | |
| 2012/0139131 A1* | 6/2012 | Sugo | C08G 77/455 |
| | | | 257/787 |
| 2016/0115313 A1 | 4/2016 | Tang et al. | |
| 2016/0369099 A1 | 12/2016 | Moon et al. | |
| 2017/0022356 A1 | 1/2017 | Yamazawa et al. | |
| 2018/0148555 A1 | 5/2018 | Moon et al. | |

FOREIGN PATENT DOCUMENTS

| | | |
|---|---|---|
| CN | 101643565 A | 2/2010 |
| CN | 103756315 A | 4/2014 |
| CN | 105408418 A | 3/2016 |
| CN | 107353642 A | 11/2017 |
| JP | 2004-231847 A | 8/2004 |
| JP | 2014-47348 A | 3/2014 |
| JP | 2016-33994 A | 3/2016 |
| JP | 2016065226 A | 4/2016 |
| JP | 2018-518563 A | 7/2018 |
| KR | 10-2004-0015268 A | 2/2004 |
| KR | 10-2005-0064450 A | 6/2005 |
| KR | 10-2009-0071774 A | 7/2009 |
| KR | 10-2009-0082404 A | 7/2009 |
| KR | 10-2010-0103942 A | 9/2010 |
| KR | 10-2013-0091099 A | 8/2013 |
| KR | 10-2015-0037568 A | 4/2015 |
| KR | 10-2016-0007599 A | 1/2016 |
| KR | 10-2016-0007600 A | 1/2016 |
| KR | 10-1582398 B1 | 1/2016 |
| KR | 10-2016-0091887 A | 8/2016 |
| KR | 10-2017-0084991 A | 7/2017 |
| TW | 201736494 | 10/2017 |
| WO | 2013/111345 A1 | 8/2013 |
| WO | 2017/122952 A1 | 7/2017 |

\* cited by examiner

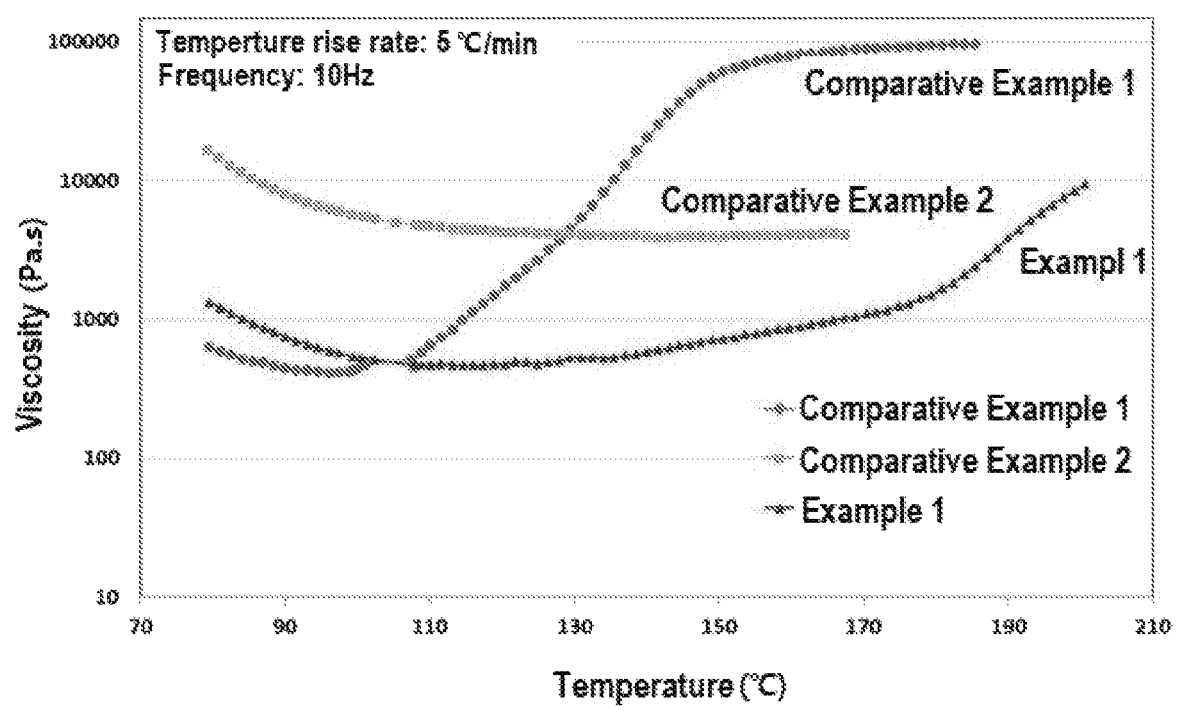

THERMOSETTING RESIN COMPOSITION FOR COATING METAL THIN FILM AND METAL LAMINATE USING THE SAME

The present application is a National Phase entry pursuant to 35 U.S.C. 371 of International Application No. PCT/KR2018/015649 filed on Dec. 11, 2018, and claims priority to and the benefit of Korean Patent Application No. 10-2017-0169493 filed with Korean Intellectual Property Office on Dec. 11, 2017, and Korean Patent Application No. 10-2018-0157084 filed with Korean Intellectual Property Office on Dec. 7, 2018, the entire contents of which are incorporated herein by reference.

FIELD

The present invention relates to a thermosetting resin composition for coating a metal thin film having excellent flowability and pattern-filling properties, and a metal laminate using the same.

BACKGROUND

A copper clad laminate used for a conventional printed circuit board is produced by impregnating a glass fabric substrate with a varnish of the thermosetting resin and then semi-curing it to prepare a prepreg, which is then heated and pressed together with a copper foil. A circuit pattern is formed on such a copper clad laminate and a prepreg is again used for building-up thereon.

Recently, achieving higher performance, weight reduction, and thickness reduction of electronic devices, communication devices, personal computers, smart phones and the like has accelerated, semiconductor packages are also required to be reduced in size. At the same time, there is a growing need to reduce the thickness of printed circuit boards for semiconductor packages.

In other words, as the form factor of electronic devices has recently been reduced, the thickness of the semiconductor package becomes smaller and smaller.

However, since a prepreg, which is a laminated material among conventional package components, includes a woven glass fabric, it is difficult to reduce the thickness by more than a certain amount.

On the other hand, since a resin-coated copper (RCC) foil as an alternative material for a prepreg does not contain glass fibers, its thickness can be made smaller than the prepreg.

Among the properties of the above-mentioned laminated material, the most important feature is a property of filling a pattern (reclamation property). That is, since the resin-coated copper foil as a laminated material must be filled with a pattern, flowability of the resin is an important feature. In particular, as the thickness of the resin-coated copper foil laminate becomes smaller, the amount of resin is reduced, and it is difficult to fill the pattern. If the pattern is not properly filled, an empty void is generated, and reliability, performance, and the like of the semiconductor substrate are deteriorated. When the thickness of the resin-coated copper foil is reduced, the amount of the resin is also reduced. Thus, the pattern is not filled, and the probability of generating voids after lamination increases. In other words, if the thickness of the resin is reduced to make the substrate thinner, the pattern-filling property is deteriorated.

Therefore, in order to increase the pattern-filling property while reducing the thickness, it is necessary to increase the flowability of the resin.

A commonly used method to achieve this is to use a monomolecular resin. In the case of a resin having a low molecular weight, since the viscosity before curing is low within the lamination process temperature range, the flowability and the pattern-filling property are excellent. However, since monomolecular resins have surface stickiness before curing, a protective film is required. Further, as the curing reaction proceeds slowly during storage at room temperature, it has a disadvantage that it is vulnerable to changes over time and storage stability.

SUMMARY

An object of the present invention is intended to provide a thermosetting resin composition for coating a metal thin film which is excellent in flowability and pattern-filling property by widening a temperature range for maintaining a minimum viscosity.

Another object of the present invention is to provide a metal laminate for a semiconductor package including a resin coating layer which is a cured product of the thermosetting resin composition which is excellent in thermal properties and mechanical properties with a high glass transition temperature, and a method for producing the same.

In order to achieve the above-mentioned objects, the present invention provides a thermosetting resin composition for coating a metal film including:

a binder resin containing an epoxy resin, a cyanate ester resin, a bismaleimide resin, and a benzoxazine resin; a rubber-based component; and an inorganic filler, wherein the rubber-based component includes at least one selected from the group consisting of a styrene-butadiene-based rubber, a neoprene-based rubber, a nitrile-based rubber, a butyl-based rubber, a butadiene-based rubber, an ethylene propylene-based rubber, a silicone-based rubber, a urethane-based rubber, and an acrylic-based rubber, wherein the rubber-based component is contained in an amount of at least 5 parts by weight and less than 20 parts by weight, based on 100 parts by weight of the binder resin, and wherein the thermosetting resin composition satisfies the condition of a complex viscosity of 3500 Pa·s or less in the range in which a rheometer lowest viscosity window is 90 to 180° C.

The present invention also provides a metal laminate including a resin coating layer in which a thermosetting resin composition is cured on at least one surface of a metal film, wherein the resin coating layer includes:

a cured product between a binder resin containing an epoxy resin, a cyanate ester resin, a bismaleimide resin, and a benzoxazine resin, and at least one rubber-based component selected from the group consisting of a styrene-butadiene-based rubber, a neoprene-based rubber, a nitrile-based rubber, a butyl-based rubber, a butadiene-based rubber, an ethylene propylene-based rubber, a silicone-based rubber, a urethane-based rubber, and an acrylic-based rubber; and a filler dispersed in the cured product.

In addition, the present invention provides a method for producing a metal laminate, including coating the aforementioned thermosetting resin composition onto at least one surface of the metal film.

Further, the present invention provides a metal foil clad laminate in which metal laminates are laminated into one or more layers.

BRIEF DESCRIPTION OF THE DRAWING

FIG. 1 shows a rheometer curve for confirming the flowability and pattern-filling property of Example 1 of the present invention and Comparative Examples 1 and 2.

DETAILED DESCRIPTION

Hereinafter, a thermosetting resin composition, a resin-coated metal laminate, and a metal foil clad laminate using the same, according to specific embodiments of the present invention, will be described in more detail.

First, the metal laminate of the present invention can include a form in which the thermosetting resin composition is coated onto the metal thin film in a predetermined thickness.

The metal thin film is a substrate for coating a resin composition, and may be in the form of a thin film containing a single or composite metal component as described below. Further, the metal foil clad laminate may include a structure in which the metal laminate layers are laminated into one or more layers.

According to one embodiment of the invention, a thermosetting resin composition for coating a metal thin film is provided, including: a binder resin containing an epoxy resin, a cyanate ester resin, a bismaleimide resin, and a benzoxazine resin; a rubber-based component; and an inorganic filler, wherein the rubber-based component includes at least one selected from the group consisting of a styrene-butadiene-based rubber, a neoprene-based rubber, a nitrile-based rubber, a butyl-based rubber, a butadiene-based rubber, an ethylene propylene-based rubber, a silicone-based rubber, a urethane-based rubber, and an acrylic-based rubber, the rubber-based component is contained in an amount of at least 5 parts by weight and less than 20 parts by weight, based on 100 parts by weight of the binder resin, and the thermosetting resin composition satisfies the condition of a complex viscosity of 3500 Pa·s or less in the range in which the rheometer lowest viscosity window is 90 to 180° C.

The present invention relates to a thermosetting resin composition which improves the flowability and pattern-filling property by intentionally retarding the curing reaction, and a metal thin film coated with such a thermosetting resin composition.

Conventionally, a metal foil clad laminate has been mainly produced by using a prepreg obtained by impregnating a resin composition in a woven glass fabric. However, there is a limit in reducing the thickness, and there is also a problem that if the thickness decreases, the flowability of the resin is decreased during the lamination process of the copper foil, and thus the pattern-filling property is poor. In addition, although it is possible to reduce the thickness of the copper foil coated with the resin, if a monomolecular type of resin is used, there are many disadvantages in terms of storability and stability.

Accordingly, the thermosetting resin composition of the present invention is characterized by intentionally retarding the curing reaction and optimizing the type of resin and the mixing ratio for controlling the viscosity.

Specifically, the thermosetting resin composition of the present invention can secure the flowability by adding an epoxy, a cyanate ester resin, and a benzoxazine and bismaleimide resin for controlling a curing reaction at an appropriate ratio, adding an inorganic filler for improving the mechanical strength thereto, and further adding a rubber-based component. Accordingly, in the present invention, the rheometer minimum viscosity window is widened according to intentional retardation of the curing reaction, thereby exhibiting an advantageous effect on flowability and pattern-filling property. Preferably, the present invention can improve the resin flowability and pattern-filling property by widening the window of maintaining the minimum viscosity within the temperature range of the metal foil laminating process.

For example, assuming that the complex viscosity suitable for filling the pattern is 3500 Pa·s or less, in the case of the thermosetting resin composition proposed in the present invention, the temperature range satisfying the viscosity condition is 90 to 180° C., or about 115 to 180° C., which is very wide. That is, the flowability in the laminating process section is high and the pattern-filling property is excellent. However, when the complex viscosity condition of the thermosetting resin composition becomes too high by exceeding the above range, the flowability is decreased so the pattern-filling property may become poor. Further, even if the complex viscosity condition is satisfied, the conventional thermosetting resin composition may have a relatively narrow working temperature range.

Now, the components of the thermosetting resin composition and the metal thin film and the metal laminate using the resin composition according to a preferred embodiment of the present invention will be described in more detail.

The thermosetting resin composition of one embodiment may include a binder resin.

The binder resin may include at least one resin selected from the group consisting of an epoxy resin, a bismaleimide resin, a cyanate ester resin, and a bismaleimide resin.

In this case, as the epoxy resin, any of those commonly used for the thermosetting resin composition can be used without limitation, and the kind thereof is not limited. Examples thereof may be a bisphenol A type of epoxy resin, a phenol novolac epoxy resin, a phenyl aralkyl type of epoxy resin, a tetraphenyl ethane epoxy resin, a naphthalene-based epoxy resin, a biphenyl-based epoxy resin, a dicyclopentadiene epoxy resin, and a mixture of a dicyclopentadiene-based epoxy resin and a naphthalene-based epoxy resin.

Specifically, the epoxy resin may be a bisphenol A type of epoxy resin represented by the following Chemical Formula 1, a novolac type of epoxy resin represented by the following Chemical Formula 2, a phenyl aralkyl type of epoxy resin represented by the following Chemical Formula 3, a tetraphenyl ethane type of epoxy resin represented by the following Chemical Formula 4, a naphthalene type of epoxy resin represented by the following Chemical Formulas 5 and 6, a biphenyl type of epoxy resin represented by the following Chemical Formula 7, and a dicyclopentadiene type of epoxy resin represented by the following Chemical Formula 8.

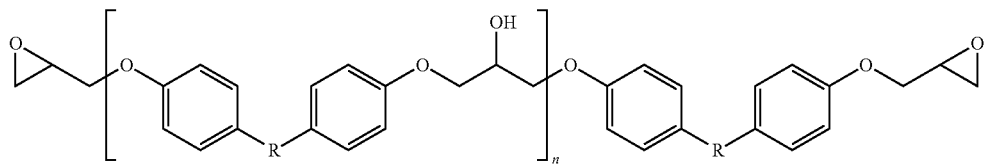
[Chemical Formula 1]

In Chemical Formula 1,
R is

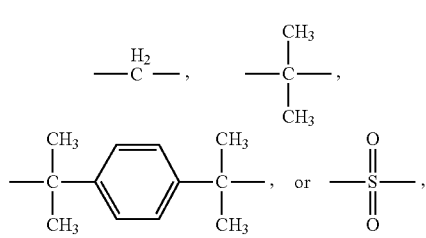

and
n is an integer of 0 or 1 to 50.

More specifically, depending on the type of R, the epoxy resin of Chemical Formula 1 may be a bisphenol A type of epoxy resin, a bisphenol F type of epoxy resin, a bisphenol M type of epoxy resin, or a bisphenol S type of epoxy resin, respectively.

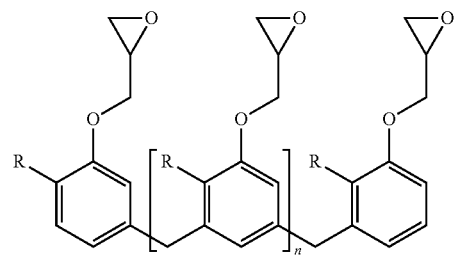
[Chemical Formula 2]

In Chemical Formula 2,
R is H or $CH_3$, and
n is an integer of 0 or 1 to 50.

More specifically, depending on the type of R, the novolac type of epoxy resin of Chemical Formula 2 may be a phenol novolac type of epoxy resin or a cresol novolac type of epoxy resin, respectively.

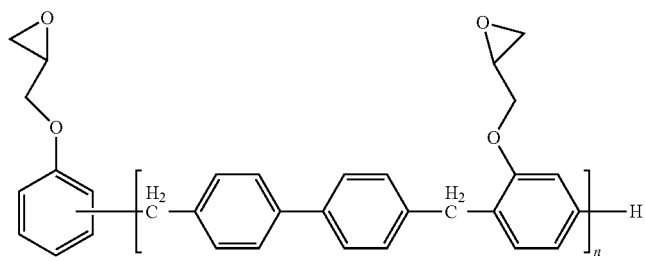
[Chemical Formula 3]

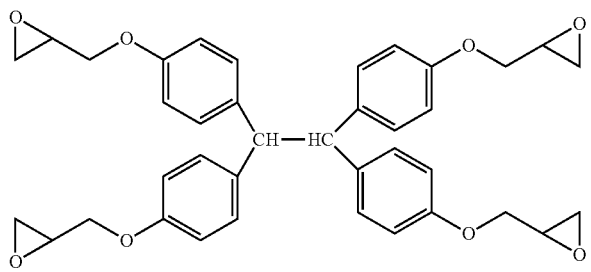
[Chemical Formula 4]

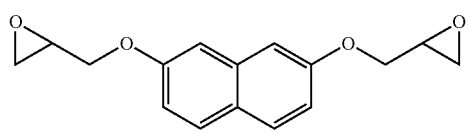
[Chemical Formula 5]

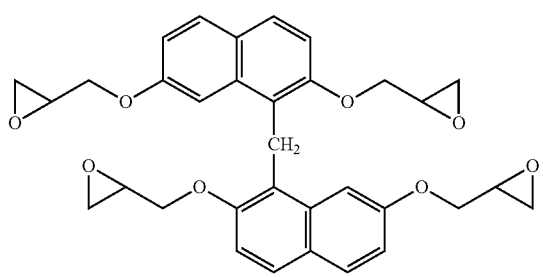
[Chemical Formula 6]

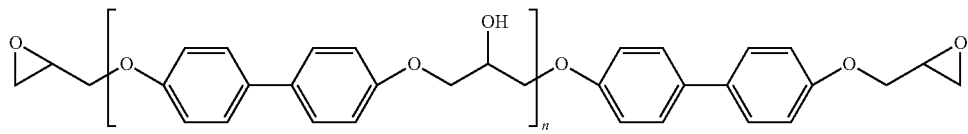

[Chemical Formula 7]

In Chemical Formula 7,
n is an integer of 0 or 1 to 50.

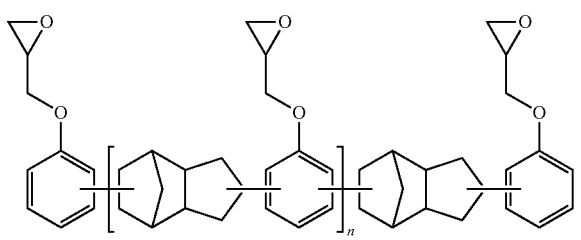

[Chemical Formula 8]

In Chemical Formula 8, n is an integer of 0 or 1 to 50.

The epoxy resin may be used in an amount of 10 to 60% by weight based on the total weight of the entire binder.

When the amount of the epoxy resin used is less than 10% by weight, there is a problem that it is difficult to realize a high Tg, and when it exceeds 60% by weight, there is a problem that the flowability is deteriorated.

As the cyanate ester resin, any of those commonly used in the thermosetting resin composition can be used without limitation, and the type thereof is not limited.

As a preferred example, the cyanate ester resin may be at least one selected from the group consisting of a novolac type of cyanate resin, a dicyclopentadiene type of cyanate resin, a bisphenol type of cyanate resin, and their partially-triazinated prepolymers. More specifically, the cyanate ester resin may include a novolac type of cyanate resin represented by the following Chemical Formula 9, a dicyclopentadiene type of cyanate resin represented by the following Chemical Formula 10, a bisphenol type of cyanate resin represented by the following Chemical Formula 11, and their partially-triazinated prepolymers. These resins may be used alone or in combination of two or more.

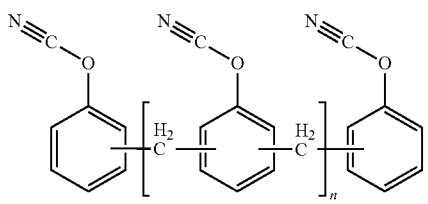

[Chemical Formula 9]

In Chemical Formula 9,
n is an integer of 0 or 1 to 50.

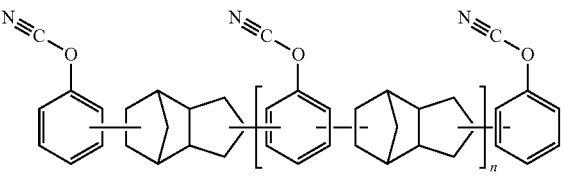

[Chemical Formula 10]

In Chemical Formula 10,
n is an integer of 0 or 1 to 50.

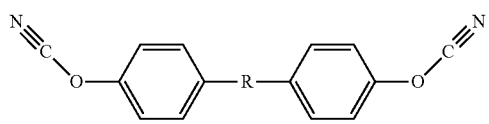

[Chemical Formula 11]

In Chemical Formula 11,
R is

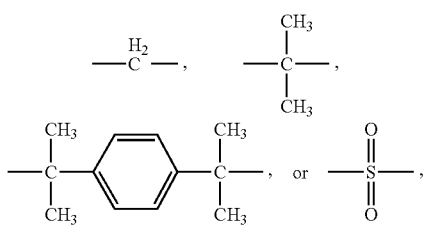

More specifically, depending on the type of R, the cyanate resin of Chemical Formula 11 may be a bisphenol A type of cyanate resin, a bisphenol E type of cyanate resin, a bisphenol F type of cyanate resin, or a bisphenol M type of cyanate resin.

The cyanate resin may be used in an amount of 20 to 70% by weight based on the total weight of the entire binder. When the amount of the cyanate resin used is less than 20% by weight, there is a problem that it is difficult to realize a high Tg, and when the amount of the cyanate resin is more than 70% by weight, it may adversely affect chemical resistance such as desmearing, and gas generation is increased.

As the bismaleimide resin, any of those commonly used in the thermosetting resin composition can be used without limitation, and the type thereof is not limited.

According to one embodiment, the bismaleimide resin is at least one selected from the group consisting of a diphenylmethane type of bismaleimide resin represented by the following Chemical Formula 12, a phenylene type of bismaleimide resin represented by the following Chemical Formula 13, a bisphenol A type of diphenyl ether bismaleimide resin represented by the following Chemical Formula 14, and a bismaleimide resin composed of an oligomer of a diphenylmethane type of bismaleimide and a phenylmethane type of maleimide represented by the following Chemical Formula 15.

[Chemical Formula 12]

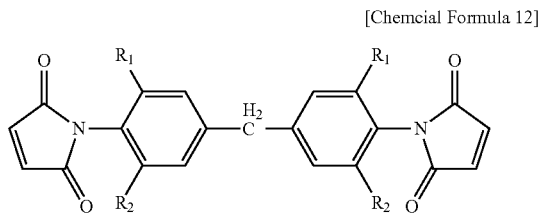

In Chemical Formula 12,
$R_1$ and $R_2$ are each independently H, $CH_3$, or $C_2H_5$.

[Chemical Formula 13]

[Chemical Formula 14]

[Chemical Formula 15]

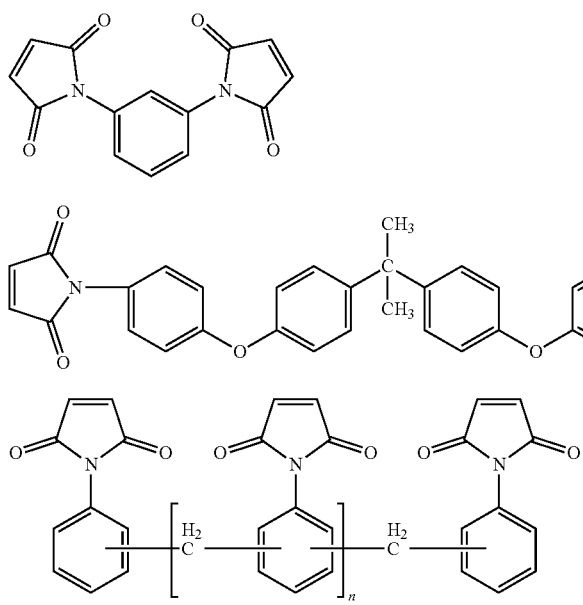

In Chemical Formula 15,
n is an integer of 0 or 1 to 50.

The bismaleimide resin may be used in an amount of 5 to 60% by weight based on the total weight of the entire binder.

When the amount of the bismaleimide resin used is less than 5% by weight, there is a problem that desired physical properties cannot be achieved. When the amount of the bismaleimide resin is more than 60% by weight, there are many unreacted groups which adversely affect characteristics such as chemical resistance.

Further, the binder of one embodiment may include a benzoxazine resin.

In the present invention, the reaction rate can be controlled by changing the phenol novolac used as a conventional curing agent to a benzoxazine resin.

That is, the phenol novolac curing agent, which has been mainly used in the past, generally has a hydroxyl group in its own structure and reacts with an epoxy resin and the like at room temperature, and thus the initial reaction rate is high.

On the other hand, the benzoxazine resin used in the present invention acts as a curing agent and has a property of generating a hydroxyl group at a temperature of 150° C. or higher. Consequently, the reaction occurs slowly at room temperature or at an early stage, but it is possible to control the reaction rate by participating in the reaction at a predetermined temperature or higher.

Accordingly, the benzoxazine resin used in the present invention can control the reaction rate, thereby ensuring the flowability of the resin. In addition, the benzoxazine enables curing of the above-mentioned epoxy resin and bismaleimide resin.

That is, the benzoxazine resin can be used as a curing agent for the epoxy resin and the bismaleimide resin. Unlike the conventional phenol novolac resin, as the benzoxazine resin is used as a curing agent for the bismaleimide resin, the curing reaction of the resins that can be carried out even at a low temperature, such as the drying process, occurs less, and the curing degree of the resin composition is lowered, thereby ensuring flowability. This provides the effect of minimizing the appearance of defects occurring in the process of producing the resin-coated single metal foil and the metal laminate, as well as in the pressing process used in the build-up process.

Such a benzoxazine resin may be at least one selected from the group consisting of a bisphenol A type of benzoxazine resin, a bisphenol F type of benzoxazine resin, a phenolphthalein benzoxazine resin, and a mixture of these benzoxazine resins, and some curing accelerator.

The benzoxazine resin may be used in an amount of 2 to 15% by weight, based on the total weight of the entire binder, so that sufficient curing of the bismaleimide resin contained in the binder can be induced. At this time, when the benzoxazine resin is contained in an excess amount, the curing reaction rate during the preparation of the resin composition may be retarded more than necessary and the process efficiency may be lowered. Accordingly, the benzoxazine resin is preferably contained in an amount of 15% by weight or less based on the total weight of the binder. However, if the content is too small, the effect as a desired curing agent cannot be exhibited, and thus the chemical resistance and Tg cannot be improved. Therefore, it is preferable to use the benzoxazine resin within the above-mentioned range.

Meanwhile, the thermosetting resin composition of one embodiment may include a rubber-based component together with the binder component.

In the present invention, by including a specific rubber-based component at a certain ratio together with a binder, the thermosetting composition for coating a metal thin film satisfies the condition of a complex viscosity of 3500 Pa·s or less in the range in which the rheometer lowest viscosity window is 90 to 180° C. The lower limit of the complex viscosity condition is not particularly limited, and may be, for example, 100 Pa·s or more or 500 Pa·s or more.

Specifically, the compound that satisfies the complex viscosity condition may be at least one rubber-based component selected from the group consisting of a styrene butadiene-based rubber, a neoprene-based rubber, a nitrile-based rubber, a butyl-based rubber, a butadiene-based rubber, an ethylene propylene-based rubber, a silicone-based rubber, a urethane-based rubber and, an acrylic-based rubber.

More preferably, the rubber-based component may be at least one selected from the group consisting of a butadiene-based rubber, a silicone-based rubber, and an acrylic-based rubber.

Further, the rubber-based component characterized by the present invention may contain 5 to 20 parts by weight or less of at least one rubber-based component selected from the group consisting of a styrene butadiene-based rubber, a neoprene-based rubber, a nitrile-based rubber, a butyl-based rubber, a butadiene-based rubber, an ethylene propylene-based rubber, a silicone-based rubber, a urethane-based rubber, and an acrylic-based rubber, based on 100 parts by weight of the binder resin.

Preferably, the rubber-based component may be contained at 5 to 15 parts by weight, or 5 to 10 parts by weight, based on 100 parts by weight of the binder resin. When the content of the rubber-based component is less than 5 parts by weight, there is a problem that the flowability of the resin is too high and the deviation of thickness increases. When the content of the rubber-based component is more than 20 parts by weight, there is a problem that the flowability is very low and the pattern-filling property is lowered. At this time, the optimum ratio of the rubber-based component for improving flowability and pattern-filling property may be 5 to 10 parts by weight, based on 100 parts by weight of the binder resin.

Among the rubber-based components, the butadiene-based rubber may include a copolymer including a butadiene repeating unit in which a terminal group is substituted with a hydroxy group, a butadiene repeating unit containing acrylic-based group, or a butadiene repeating unit containing an epoxy group, and having a weight average molecular weight of $1 \times 10^3$ to $5 \times 10^4$.

Further, the silicone-based rubber may include a copolymer including an epoxy group or a polyether-modified silicone repeating unit, or a silicone repeating unit in which a terminal group is substituted with an amine group or an epoxy group, and having a weight average molecular weight of $1 \times 10^3$ to $5 \times 10^4$.

The acrylic-based rubber is contained in the resin composition and thus can exhibit low curing shrinkage characteristics. In addition, the acrylic-based rubber can further enhance the effect of the expansion relaxation action.

The acrylic-based rubbers used herein are those having a molecular structure in which the acrylic acid ester copolymer has rubber elasticity.

Specifically, the acrylic-based rubber may include an acrylic acid ester copolymer containing a repeating unit derived from butyl acrylate and a repeating unit derived from acrylonitrile, an acrylic acid ester copolymer containing repeating units derived from butadiene, or a repeating unit derived from an alkyl acrylate and containing a linear or branched alkyl group having 2 to 10 carbon atoms. On the other hand, the weight average molecular weight of the acrylic-based rubber is $30 \times 10^4$ to $65 \times 10^4$. If the weigh average molecular weight is out of the above range, the flowability may be insufficient or excessive.

Further, the type of the styrene butadiene-based rubber, the neoprene-based rubber, the nitrile-based rubber, the butyl-based rubber, the ethylene propylene-based rubber, and the urethane-based rubber is not particularly limited, and materials that are well known in the art may be used.

Preferably, the rubber-based component may be at least one selected from the group consisting of a butadiene-based rubber, a silicone-based rubber, and an acrylic-based rubber.

In addition, the thermosetting resin composition of one embodiment may include an inorganic filler. The inorganic filler can be used without particular limitation as long as it is well known in the art to which the present invention belongs. For example, the inorganic filler may be at least one compound selected from the group consisting of silica, aluminum trihydroxide, magnesium hydroxide, molybdenum oxide, zinc molybdate, zinc borate, zinc stannate, alumina, clay, kaolin, talc, calcined kaolin, calcined talc, mica, short glass fiber, glass fine powder, and hollow glass.

The content of the inorganic filler may be 160 to 350 parts by weight, based on 100 parts by weight of the binder resin. Specifically, the content of the inorganic filler may be 200 to 250 parts by weight, based on 100 parts by weight of the binder resin.

The average particle diameter of the inorganic filler is preferably 0.1 μm to 100 μm. The inorganic filler may be a substance of which the surface is treated with silane, if necessary. In the inorganic filler, it is desirable to increase the packing density by mixing small particles of a nanoscale and large particles of a microscale.

The inorganic filler may be dispersed in the binder resin. The inorganic filler being dispersed in the binder resin means a state in which the inorganic filler and the binder resin are not separated from each other and are mixed. That is, in the thermosetting resin composition of the one embodiment, a separation phase such as an inorganic filler separation phase or a resin separation phase made of resin is not formed, and the inorganic filler and the resin can be uniformly mixed to form a dispersed phase.

Accordingly, even when the inorganic filler is filled with a high content, it is possible to achieve an appropriate level of flowability, high thermal stability, and mechanical properties when coated onto a copper foil.

On the other hand, the thermosetting resin composition according to one embodiment of the present invention may further include at least one additive selected from the group consisting of solvents, ultraviolet absorbers, antioxidants, photopolymerization initiators, fluorescence brighteners, photosensitizers, pigments, dyes, thickeners, lubricants, antifoaming agents, dispersants, leveling agents, and brighteners.

Specifically, the thermosetting resin composition according to one embodiment can be used as a solution by adding a solvent, if necessary. The type of the solvent is not particularly limited as long as it exhibits good solubility in the resin component. For example, an alcohol type, an ether type, a ketone type, an amide type, an aromatic hydrocarbon type, an ester type, a nitrile type, and the like can be used, and these solvents may be used alone or in combination of two or more. The content of the solvent is not particularly limited as long as it can be suitably used for adjusting the viscosity during the production of the thermosetting resin composition.

The present invention may further include various other polymer compounds such as other thermosetting resins, thermoplastic resins, and oligomers and elastomers thereof, and flame retardant compounds or additives, as long as it does not impair characteristics inherent to the thermosetting resin composition. These compounds are not particularly limited as long as they are selected from those commonly used in the art. Examples of the additives include ultraviolet absorbers, antioxidants, photopolymerization initiators, fluorescence brighteners, photosensitizers, pigments, dyes, thickeners, lubricants, antifoaming agents, dispersants, leveling agents, brighteners, and the like, and these may be used by being mixed to meet the purpose. The thermosetting resin composition according to an embodiment of the present invention having such a configuration can satisfy the condition of a complex viscosity of 3500 Pa·s or less, or 2000 Pa·s or less, in the range in which the rheometer lowest viscosity window is 90 to 180° C.

That is, assuming that the complex viscosity suitable for filling the pattern is 3500 Pa·s or less, in the case of the resin composition proposed in the present invention, the temperature range satisfying the viscosity condition is 90 to 180° C., which is very wide. Therefore, the flowability within the laminating process section is high so voids are not generated after the resin lamination, thereby exhibiting an excellent pattern-filling property.

As the thermosetting resin composition of the present invention has the flowability of the resin, a metal laminate can be made using a metal thin film or the flowability can be secured during a build-up process. Thus, the fine pattern can be easily filled.

That is, the thermosetting resin composition of the present invention exhibits the condition of the minimum complex viscosity of a specific value due to curing which can widen a window for maintaining the minimum viscosity. Thus, voids are not generated at the time of pattern filling, and the effect of improving the pattern-filling property can be provided.

Further, by using the thermosetting resin composition of the present invention, it is possible to provide a metal laminate having reduced thickness and improved stability and storability through the step of coating it onto at least one surface of the metal thin film.

<Metal Laminate>

According to another embodiment of the present invention, a metal laminate including a resin coating layer in which the thermosetting resin composition is cured on at least one surface of the metal thin film can be provided, wherein the resin coating layer includes: a cured product between a binder resin containing an epoxy resin, a cyanate ester resin, a bismaleimide resin, and a benzoxazine resin, and at least one rubber-based component selected from the group consisting of a styrene-butadiene-based rubber, a neoprene-based rubber, a nitrile-based rubber, a butyl-based rubber, a butadiene-based rubber, an ethylene propylene-based rubber, a silicone-based rubber, a urethane-based rubber, and an acrylic-based rubber; and a filler dispersed in the cured product.

According to still another embodiment, a method for producing a metal laminate can be provided, including coating the aforementioned thermosetting resin composition onto at least one surface of the metal thin film.

In addition, according to still another embodiment, a metal laminate in which one or more metal laminate layers are laminated can be provided.

Specifically, the present invention provides a resin-coated metal laminate including a cured product of the aforementioned thermosetting resin composition.

As described above, according to the present invention, a metal laminate exhibiting excellent thermal and mechanical properties can be provided by a simple method in which a resin composition which is excellent in flowability and pattern-filling property of a resin is prepared in the form of a varnish and then directly coated onto a metal thin film. According to the above process, the thermosetting resin including a filler may be formed as a cured product on at least one side of the metal thin film, and the filler may be uniformly dispersed in the cured product.

Thus, according to one embodiment of the present invention, a step of coating the thermosetting resin composition onto at least one surface of the metal thin film can be included.

In addition, the method for producing the metal laminate may further include a step of curing the thermosetting resin composition coated on at least one surface of the metal thin film. After the curing step of the thermosetting resin composition, a well-known drying step may be further carried out, if necessary.

In the present invention, the curing reaction of the resin is intentionally delayed to lengthen the window in which the minimum viscosity in the temperature range of the lamination process is maintained.

Preferably, in the step of curing the thermosetting resin composition, the curing can be carried out at a temperature of 180 to 250° C. for 1 to 4 hours.

In addition, the method of coating the thermosetting resin composition on the metal thin film is not particularly limited, and a coating method that is well known in the art can be used.

As an example, a method of putting the thermosetting resin composition of the present invention in a coater device and coating it on at least one surface of the metal thin film to a certain thickness can be used. As the coater device, a comma coater, a blade coater, a lip coater, a road coater, a squeeze coater, a reverse coater, a transfer roll coater, a gravure coater, a spray coater, and the like, may be used.

Further, a carrier film may be used for evaluation of the flowability. For the carrier film, a plastic film such as a polyethylene terephthalate (PET) film, a polyester film, a polyimide film, a polyamideimide film, a polypropylene film, and a polystyrene film may be used.

On the other hand, the varnish used for the coating may be in a state in which a solvent is added to the thermosetting resin composition. The solvent for resin varnish is not particularly limited as long as it is miscible with the resin component and has good solubility. Specific examples thereof include ketones such as acetone, methyl ethyl ketone, methyl isobutyl ketone, and cyclohexanone, aromatic hydrocarbons such as benzene, toluene, and xylene, amides such as dimethylformamide and dimethylacetamide, and aliphatic alcohols such as methyl cellosolve and butyl cellosolve.

The metal thin film may include a copper foil; an aluminum foil; a three-layer structural composite foil which includes nickel, nickel-phosphorus, a nickel-tin alloy, a nickel-iron alloy, lead, or a lead-tin alloy as an intermediate layer, and having copper layers of different thicknesses on both sides thereof; or a two-layer structural composite foil in which aluminum and a copper foil are combined.

According to one preferred embodiment, for the metal thin film used in the present invention, a copper foil or an aluminum foil is used, and those having a thickness of about 2 to 200 μm can be used, but the thickness thereof is preferably about 2 to 35 μm.

More preferably, a copper foil is used as the metal thin film. Further, according to the present invention, as a metal thin film, a three-layer structural composite foil including nickel, nickel-phosphorus, a nickel-tin alloy, a nickel-iron alloy, lead, a lead-tin alloy, or the like as an intermediate layer, and having a copper layer having a thickness of 0.5 to 15 μm and a copper layer having a thickness of 10 to 300 μm on both sides thereof, or a two-layer structural composite foil in which aluminum and a copper foil are combined.

According to the method described above, the present invention can satisfy the minimum complex viscosity condition in a wider temperature range as compared with the conventional one by including the resin coating layer in which the thermosetting resin composition is cured on at least one surface of the metal thin film. In particular, the present invention can provide a metal laminate having excellent flowability and pattern-filling property.

At this time, the thickness of the resin coating layer in the metal laminate may be 5 μm to 90 μm, and preferably 5 μm to 30 μm. Even if such a cured product is formed thin on the metal thin film, it is possible to exhibit excellent thermal and mechanical properties with respect to the metal thin film.

Further, in the metal laminate of the present invention, the glass transition temperature (Tg) of the resin after curing is 270 to 310° C., or 290 to 310° C. The dielectric characteristic (Dk/Df) of the metal thin film, which is measured by obtaining Dk and Df at 1 GHz by the SPDR method, is 3.3/0.006, which is excellent.

Further, the present invention exhibits an excellent pattern-filling property when comparing at the same thickness as compared with the existing resin-coated copper foil made of a monomolecular type, and also exhibits relatively excellent room temperature stability in a change test with time.

As described above, according to another embodiment, a metal foil clad laminate in which metal laminates are laminated into one or more layers may be provided.

In this case, the metal foil clad laminate may further include a metal thin film. For example, in the metal foil, the resin layer of the metal laminate can be in contact therewith.

Further, when providing the metal foil clad laminate, the metal thin film can be used for lamination after etching and pattern fabrication. For example, when the second layer is laminated on the first layer, which is a metal thin film, a method of patterning the metal thin film (mainly Cu) as a first layer through complete etching or partial etching, then bringing the resin coating layer of the metal plate laminate into contact with the metal thin film, and laminating a second layer thereon, can be carried out.

Therefore, the metal foil clad laminate thus produced can be provided in the form of a metal laminate with one or more laminated layers. Preferably, the metal laminated plate may include two metal laminates that are laminated such that the resin layers formed on the metal laminates face each other.

Furthermore, the present invention can be used for producing a double-sided or multi-layer printed circuit boards after laminating into one or more layers by using the metal laminate.

In the present invention, the metal foil laminated plate can be circuit processed to produce a double-sided or multi-layer printed circuit board. In the circuit processing, a method performed in a general manufacturing process of a double-sided or multi-layer printed circuit board can be applied.

As described above, according to the present invention, by using the above-mentioned thermosetting resin composition, it is possible to provide a metal thin film coated with a resin applicable to any of printed circuit boards in various fields.

The thermosetting resin composition for coating a metal thin film of the present invention optimizes the type of the resins constituting the binder, and the mixing ratio thereof, and includes a small amount of the rubber-based component, thereby intentionally retarding the curing reaction of the resin. Thus, it is possible to provide an effect of increasing the flowability in the laminating process temperature range and of exhibiting superior pattern-filling properties as compared with the prior art. In particular, according to the present invention, even if the thickness of the laminated material is thin, since the rheometer lowest viscosity window is wider than the conventional one, the pattern-filling property can be improved and it is possible to improve the reliability and performance of the semiconductor element as well as to reduce the thickness of the substrate.

In addition, the present invention has the effect of providing a metal thin film having excellent thermal and mechanical properties of the resin layer after curing, and also having excellent dielectric characteristics. That is, when the resin composition of the present invention is used, it is possible to provide a thin metal laminate by directly coating the resin composition on the metal foil by a simple method without using a method which has to produce the prepreg using glass fabric. Furthermore, the present invention can provide a metal laminate having a relatively high glass transition temperature of the resin after curing as well as excellent dielectric characteristics. The metal thin film may be laminated by one or more layers to provide a metal laminate used for reducing the thickness of electronic devices.

EXAMPLES

The invention will be described in more detail by way of examples shown below. However, these examples are provided for the purpose of illustration only, and the scope of the present invention is not limited thereto.

Examples 1 to 6

Production of Copper Foil-Clad Laminate Coated with Resin Composition (1) Production of Thermosetting Resin Composition As shown in Table 1 below, resins such as an epoxy resin and a cyanate ester resin were dissolved in a cyclohexanone solvent to prepare a varnish. In order to control the curing reaction, benzoxazine and bismaleimide resin were added to the varnish. In addition, in order to improve the mechanical strength, a silica inorganic filler was added to the varnish.

The varnish containing the above components was stirred for 24 hours or more to prepare a coating solution.

The viscosity control and degassing of the coating solution were carried out using a rotary evaporator.

(2) Production of Metal Thin Film Coated with Thermosetting Resin Composition (Resin-Coated Copper-Clad Laminate)

The coating solution was coated (coating thickness: 16 μm) on one surface of a copper foil (thickness: 2 μm, Mitsui) with a comma coater, and then cured at 230° C. and 35 kg/cm² for 200 minutes. Subsequently, the sample was cut to a size of 17×15 cm to produce a resin-coated copper foil-clad laminate sample.

Comparative Examples 1 to 3

Production of Copper Foil Coated with Resin Composition (1) Production of Thermosetting Resin Composition A varnish was prepared using the components shown in the following Table 2 and a cyclohexanone solvent. At this time, the case where the acrylic rubber A or the acrylic-based rubber B was not used, was set as Comparative Example 1, and the case where the content range was outside the range of the present invention was set as Comparative Examples 2 to 4.

The varnish containing the above components was stirred for at least 24 hours to prepare a coating solution.

The viscosity control and degassing of the coating solution were carried out using a rotary evaporator.

(2) Production of Metal Thin Film Coated with Thermosetting Resin Composition

The coating solution was coated (coating thickness: 16 μm) on a copper foil (thickness: 2 μm, Mitsui) with a comma coater, and then cured at 230° C. and 35 kg/cm² for 200 minutes. Subsequently, the sample was cut to a size of 17×15 cm to produce a resin-coated copper foil-clad laminate sample.

Comparative Example 4

Production of a Laminated Plate including a Copper Foil Integrated with a Prepreg in which a Resin Composition is Impregnated in a Fabric Substrate (1) Production of Thermosetting Resin Composition The resin was dissolved in an organic solvent at the ratio shown in Table 2 below to form a varnish, and then the mixture was stirred for 24 hours or more.

(2) Production of Prepreg and Copper-Clad Laminate

The stirred varnish was impregnated to a woven glass fabric (thickness: 12 μm, manufactured by Asahi Glass) and then dried with hot air at a temperature of 170° C. for 2 to 5 minutes to produce a 16 μm-thick prepreg.

Then, the copper foil was vertically laminated to produce a copper clad laminate.

That is, a copper foil (thickness: 2 μm, manufactured by Mitsui) was placed on both surfaces of the prepreg produced above and laminated, and then cured at 230° C. and 35 kg/cm² for 200 minutes to produce a copper clad laminate.

TABLE 1

|  | Example 1 | Example 2 | Example 3 | Example 4 | Example 5 | Example 6 |
|---|---|---|---|---|---|---|
| Epoxy resin (wt %) | 54 | 54 | 54 | 54 | 54 | 54 |
| Cyanate ester resin A (wt %) | 27 | 27 | 27 | 27 | 27 | 27 |
| Cyanate ester resin B (wt %) | — | — | — | — | — | — |
| Bismaleimide resin (wt %) | 10 | 10 | 10 | 10 | 10 | 10 |
| Benzoxazine resin (wt %) | 9 | 9 | 9 | 9 | 9 | 9 |
| Acrylic-based resin A (parts by weight) | 5 | 10 | — | — | — | — |
| Acrylic-based resin B (parts by weight) | — | — | 5 | — | — | — |
| Silicone-based resin (parts by weight) | — | — | — | 5 | — | — |
| Butadiene rubber A (parts by weight) | — | — | — | — | 5 | — |
| Butadiene rubber B (parts by weight) | — | — | — | — | — | 5 |
| Filler A (parts by weight) | 250 | 250 | 250 | 250 | 250 | 250 |

TABLE 2

|  | Comparative Example 1 | Comparative Example 2 | Comparative Example 3 | Comparative Example 4* |
|---|---|---|---|---|
| Epoxy resin (wt %) | 46 | 54 | 54 | 54 |
| Cyanate ester resin A (wt %) | — | 27 | 27 | 27 |
| Cyanate ester resin B (wt %) | 47 | — | — | — |
| Bismaleimide resin (wt %) | 7 | 10 | 10 | 10 |
| Benzoxazine resin (wt %) | — | 9 | 9 | 9 |
| Acrylic-based resin A (parts by weight) | — | 30 | — | 4 |
| Acrylic-based resin B (parts by weight) | — | — | 30 | — |
| Filler A (parts by weight) | 250 | 250 | 250 | 250 |

Note)
Comparative Example 4 shows the composition ratio (parts by weight) of only the resins excluding the weight of the glass fabric substrate
Epoxy resin: naphthalene-based epoxy resin (HP4710, DIC Corporation)
Cyanate ester resin A: bisphenol type cyanate resin (BA-3000S, Lonza Ltd.)
Cyanate ester resin B: novolac type cyanate resin (PT-30S, Lonza Ltd.)
Bismaleimide-triazine resin: BMI-2300, DAIWA Kasei
Benzoxazine resin: phenolphthalein benzoxazine resin (XU 8282, Huntsman)
BT resin: Nanozine 600, Nanokor
Acrylic-based rubber A: SG-P3-PT197 (Mw 65 × 10⁴, Tg: 12° C.), Nagase Chemtex Coporation
Acrylic-based rubber B: SG-P3-MW1 (Mw 30 × 10⁴, Tg: 12° C.), Nagase Chemtex Coporation
Silicone-based rubber: AY42-119, Dow Corning
Butadiene rubber A: B-1000, Nippon Soda
Butadiene rubber B: RICON181, Cray Valley
Filler A: methacryl silane-treated slurry type filler, average particle diameter: 0.5 μm (SC2050MTM, Admatechs)

Experimental Example

Physical properties of the copper clad laminates produced in the examples and comparative examples were measured by the following methods.

1. Analysis of Viscosity and Flowability

In order to observe the viscosity and flowability of the resin layer depending on the temperature, the coating solutions of Example 1 and Comparative Example 1 were coated onto a PET substrate and laminated with a laminator to prepare a sample having an appropriate thickness, and the rheometer viscosity was measured (condition for viscosity measurement according to temperature, temperature rise rate: 5° C./min, frequency: 10 Hz).

In addition, the viscosity and flowability were confirmed through the presence or absence of void formation in the pattern laminating test.

For the pattern lamination test, a copper-clad laminate (CCL) having a pattern in which a copper foil thickness of 10 μm and about 60% of the total area were etched was used, and the resin copper foil-coated samples (or prepregs) obtained in the examples or comparative examples were laminated thereon.

When no void or delamination occurred, it is evaluated as 'OK', and when voids or delamination occurred, it was evaluated as 'NG'.

As a result of observing the void formation, voids did not occur in Example 1, but voids were did occur in Comparative Examples 1 and 2.

FIG. 1 shows a rheometer curve for confirming the flowability and pattern-filling property of Example 1 of the present invention and Comparative Examples 1 and 2.

From the results shown in FIG. 1, assuming that the complex viscosity suitable for filling the pattern is 3500 Pa·s or less, it can be confirmed that Example 1 of the present invention has the rheometer lowest viscosity window of 90° C. to 180° C. which is very wide, and therefore, the flowability and the pattern-filling property are more advantageous, as compared with Comparative Examples 1 and 2.

However, in the aforementioned temperature range, the complex viscosity of Comparative Example 1 was too high, and the flowability was very poor, making it difficult to fill the pattern.

In addition, in the above temperature range, Comparative Example 2 had a very high complex viscosity of 3700 Pa·s, and a large number of pattern defects (voids) occurred.

2. Change with Time

For the change with time, the resin compositions of the examples and comparative examples were preserved at room temperature/refrigerated for 3 months, and the change with time was confirmed through a pattern test.

When the change with time occurs, the curing rate of the resin is increased and the flowability is decreased, and the possibility of occurrence of voids increases.

From the test results of the pattern after room temperature/refrigerated storage for 3 months, in the case of the examples, it was observed that there was no void, and it was confirmed that the change with time was small.

3. Resin Properties after Curing

In order to analyze the physical properties of the resin after curing, two sheets of the resin-coated copper foils of the examples shown above were laminated so that the resin layers faced each other, and curing was carried out for 200 minutes under the conditions of 230° C. and 35 k/cm' through a vacuum heat press process.

Further, in Comparative Example 4, a copper-clad laminate using the above-mentioned prepreg was used in the experiment.

At the time of the experiment, the copper foil was removed by etching, and the thermal (Tg), mechanical (modulus), and dielectric characteristics (Dk/Df) of the resin layers were measured by the following method. The results are shown in Tables 3 and 4 below.

Thermal and mechanical properties were measured using analytical instruments such as DSC, TGA DMA, and TMA.

The measurement of the characteristics was carried out by SPDR method to obtain Dk and Df at 1 GHz.

(1) Glass Transition Temperature (Tg)

The glass transition temperature was measured using DMA.

(2) Modulus (GPa)

The modulus was measured using DMA.

(3) Dielectric Characteristic (Dk/Df)

Using an Agilent E5071B ENA instrument as the dielectric characteristic measuring device, the dielectric constant (Dk) and dielectric loss (Df) at 1 GHz were measured by the SPDR (split post dielectric resonance) method to calculate the dielectric characteristic (Dk/Dg).

(4) Coefficient of Thermal Expansion (CTE)

The copper foil layers of the copper clad laminate obtained in the examples and comparative examples were removed by etching and then measured using TMA (50° C. to 150° C., X-Y direction).

TABLE 3

|  |  | Example 1 | Example 2 | Example 3 | Example 4 | Example 5 | Example 6 |
|---|---|---|---|---|---|---|---|
| Tg (° C., DMA) |  | 290 | 290 | 290 | 290 | 285 | 285 |
| Modulus (GPa, 30/260° C.) |  | 13/5 | 12/5 | 12/5 | 13/5 | 11/5 | 11/5 |
| Dk/Df |  | 3.3/0.006 | 3.4/0.006 | 3.3/0.006 | 3.3/0.006 | 3.3/0.006 | 3.4/0.007 |
| CTE (ppm/° C.) |  | 16 | 15 | 15 | 15 | 15 | 14 |
| Lamination on Cu Pattern: Void or Delamination | Fresh | OK | OK | OK | OK | OK | OK |
|  | RT, 3 months | OK | OK | OK | OK | OK | OK |
|  | Refridge, 3 months | OK | OK | OK | OK | OK | OK |

TABLE 4

|  |  | Comparative Example 1 | Comparative Example 2 | Comparative Example 3 | Comparative Example 4 |
|---|---|---|---|---|---|
| Tg (° C., DMA) |  | 280 | 290 | 290 | 290 |
| Modulus (GPa, 30/260° C.) |  | 15/5 | 12/5 | 11/5 | 23/13 |
| Dk/Df |  | 3.4/0.006 | 3.4/0.006 | 3.4/0.006 | 3.9/0.007 |
| CTE (ppm/° C.) |  | 16 | 15 | 14 | 8.2 |
| Lamination on Cu Pattern: Void or Delamination | Fresh | NG | NG | NG | NG |
|  | RT, 3 months | NG | NG | NG | NG |
|  | Refridge, 3 months | NG | NG | NG | NG |

Through the above examples and comparative examples, the glass transition temperature (Tg) of the examples of the present invention was measured as 290° C., the dielectric constant (Dk) as 3.3, and the dielectric loss tangent (Df) was 0.006.

In addition, it was confirmed through the presence or absence of void formation in the pattern lamination test that in Examples 1 to 6 of the present invention, the range of the minimum viscosity window was wide and the flowability was excellent, as compared with Comparative Examples 1 to 4.

The invention claimed is:

1. A thermosetting resin composition for coating a metal film comprising: a binder resin containing an epoxy resin, a cyanate ester resin, a bismaleimide resin, and a benzoxazine resin;
a rubber-based component; and
an inorganic filler,
wherein the rubber-based component includes at least one selected from the group consisting of a butadiene-based rubber, and a silicone-based rubber, wherein the silicone-based rubber includes a copolymer including an epoxy group or a polyether-modified silicone repeating unit, or a silicone repeating unit in which a terminal group is substituted with an amine group or an epoxy group, and having a weight average molecular weight of $1\times10^3$ to $5\times10^4$, and wherein the butadiene-based rubber includes a copolymer including a butadiene repeating unit in which a terminal group is substituted with a hydroxy group, a butadiene repeating unit containing an acrylic-based group, or a butadiene repeating unit containing an epoxy group, and having a weight average molecular weight of $1\times10^3$ to $5\times10^4$,
wherein the rubber-based component is contained in an amount of at least 5 parts by weight and less than 20 parts by weight based on 100 parts by weight of the binder resin, and
wherein the thermosetting resin composition satisfies the condition of a complex viscosity of 3500 Pa·s or less in the entire range of 90 to 180° C. when measured at a measurement frequency of 10 Hz and at a heating rate of 5° C./minute.

2. The thermosetting resin composition for coating a metal film according to claim 1, wherein the rubber-based component is contained at 5 to 15 parts by weight based on 100 parts by weight of the binder resin.

3. The thermosetting resin composition for coating a metal film according to claim 1,
wherein the binder includes 10 to 60% by weight of an epoxy resin, 20 to 70% by weight of a cyanate ester resin, 5 to 60% by weight of a bismaleimide resin, and 2 to 15% by weight of a benzoxazine resin.

4. The thermosetting resin composition for coating a metal film according to claim 1,
wherein the inorganic filler has an average particle diameter of 0.1 µm to 100 µm and is selected from the group consisting of silica, aluminum trihydroxide, magnesium hydroxide, molybdenum oxide, zinc molybdate, zinc borate, zinc stannate, alumina, clay, kaolin, talc, calcined kaolin, calcined talc, mica, short glass fiber, glass fine powder, and hollow glass.

5. The thermosetting resin composition for coating a metal film according to claim 1,
wherein the content of the inorganic filler is 160 to 350 parts by weight based on 100 parts by weight of the binder resin.

6. The thermosetting resin composition for coating a metal film according to claim 1, further comprising at least one additive selected from the group consisting of solvents, ultraviolet absorbers, antioxidants, photopolymerization initiators, fluorescence brighteners, photosensitizers, pigments, dyes, thickeners, lubricants, antifoaming agents, dispersants, leveling agents, and brighteners.

7. The thermosetting resin composition for coating a metal film according to claim 1, wherein the thermosetting resin composition satisfies the condition of a complex viscosity of 500 Pa·s to 3,500 Pa·s in the range of 90 to 180° C. when measured at a measurement frequency of 10 Hz and at a heating rate of 5° C./minute.

8. A metal laminate comprising a resin coating layer in which the thermosetting resin composition of claim 1 is cured on at least one surface of a metal film, wherein the resin coating layer comprises:
a cured product between the binder resin and the at least one rubber-based component; and
the filler dispersed in the cured product.

9. The metal laminate according to claim 8,
wherein the thickness of the resin coating layer is 5 µm to 90 µm and the glass transition temperature (Tg) of the resin coating layer is 270 to 310° C.

10. A metal foil clad laminate in which the metal laminates of claim 8 are laminated into one or more layers.

11. A method for producing a metal laminate, comprising coating the thermosetting resin composition of claim 1 onto at least one surface of the metal film.

* * * * *